Jan. 22, 1963

W. HAUSMANN 3,074,285

POWER TAKEOFF FOR AUTOMOTIVE VEHICLES

Filed Feb. 17, 1960

Werner Hausmann
INVENTOR.

BY

Karl F. Ross

AGENT.

Jan. 22, 1963  W. HAUSMANN  3,074,285
POWER TAKEOFF FOR AUTOMOTIVE VEHICLES
Filed Feb. 17, 1960

Werner Hausmann
*INVENTOR.*

BY

AGENT.

United States Patent Office 3,074,285
Patented Jan. 22, 1963

3,074,285
POWER TAKEOFF FOR AUTOMOTIVE VEHICLES
Werner Hausmann, Uthleben, near Nordhausen, Germany, assignor to VEB Schlepperwerk Nordhausen, Nordhausen, Harz, Germany, a corporation of Germany
Filed Feb. 17, 1960, Ser. No. 9,231
5 Claims. (Cl. 74—15.2)

My present invention relates to power-takeoff assemblies for automotive vehicles (e.g. agricultural tractors) and other engine-driven equipment.

Utility motor vehicles and other powered equipment, including, for example, agricultural tractors, forestry haulers and mining apparatus, have been provided heretofore with one or more power-takeoff shafts operatively connectable to the driving engine directly or through a suitable gear-changing transmission. Among such vehicles, agricultural tractors have generally been provided with a rear power-takeoff assembly adapted to drive post-hole diggers, seeders and the like, side assemblies adapted to be connected to generators, silage blowers and milling devices via a flexible belt and, frequently, front power-takeoff assemblies adapted to power vegetable harvesters, mowing or cutter blades and the like. Most conventional power-takeoff assemblies comprise a shaft projecting from the body of the vehicle toward either the front, the side or the rear of the vehicle. Frequently it is found desirable to utilize a laterally extending power shaft in place of or in addition to the front power-takeoff shaft (e.g. for cutter bars) or an upwardly or downwardly extending shaft at the rear of the vehicle (e.g. for post-hole diggers). The alteration of the equipment along these lines has been found to be inordinately complex and expensive.

It is, therefore, an object of the present invention to provide a multiple-power-takeoff attachment whose output shafts are adapted to extend parallel or at right angles to the conventional power-takeoff shaft, with a minimum of alteration or design change.

A more specific object of the invention resides in the provision of means for adjustably securing such multiple-power-takeoff attachment to a motor-vehicle chassis so as to accommodate various types of implements to be driven thereby.

According to a feature of my invention, I mount on the underside of the chassis or engine enclosure of an agricultural tractor or similar prime mover a housing in line with the power-takeoff shaft of the vehicle. The housing is provided with a drive shaft journaled therein and coupled at one end thereof with the power-takeoff shaft. The housing is further provided with seats to accommodate the journals of one or more additional shafts which can be selectively attached to it to extend in directions preferably perpendicular to the drive shaft. These ancillary output shafts are provided with suitable gear means engageable with a master gear carried on the drive shaft and enclosed within the housing.

According to another feature of the invention, I slidably mount a housing of the character described on rails provided on the vehicle chassis, a telescope coupling, such as a splined sleeve secured to the power-takeoff shaft of the vehicle, serving to interconnect adjacent extremities of the latter and of the drive shaft with freedom of relative axial displacement. The housing is maintained in its operative position relative to the chassis by suitable locking means. When the multiple-output assembly is used on agricultural tractors (e.g. as a front attachment), I advantageously provide means for directly securing to it the implement (e.g. cutter bar) to which at least one of the output shafts is operatively connected.

According to a more specific feature of the invention the drive shaft is provided with a bevel gear adapted to mesh with similar gears carried by the output shafts, an extremity of this shaft projecting from the housing and forming thereby a further output shaft. The projecting extremity serves as an axial extension of the power-takeoff shaft.

The above and other features, objects and advantages of my present invention will become more readily apparent from the following description, reference being made to the accompanying drawing in which.

Figure 1:
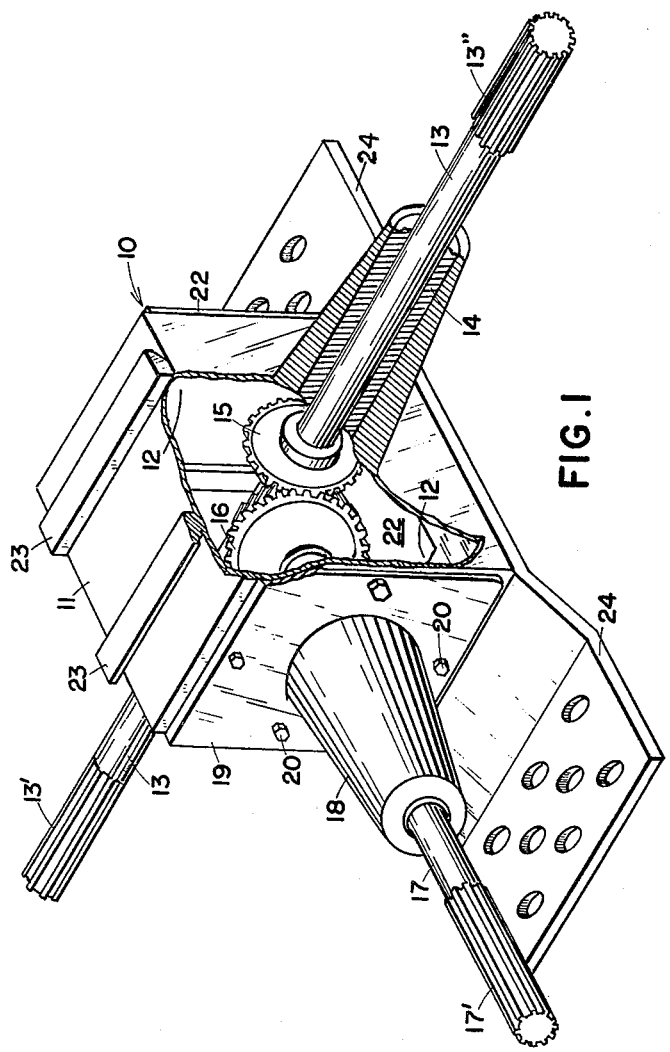
FIG. 1 is a perspective view of an assembly according to the invention.

In FIG. 1 I show a multiple-power-takeoff assembly 10, comprising a housing 11 of generally prismatic configuration which serves as a gear box and is provided with windows 12 in several of its faces. A drive shaft 13 is journaled in bearings 14 of the front and rear walls of housing 11 and carries a bevel gear 15. The master or drive gear 15 is adapted to mesh with ancillary or driven gears 16 keyed to output shafts 17 (one of which is shown) journaled in the trunnions 18 of a bearing plate 19. The bearing plate 19 may be secured to the housing 11 by bolts 20 threadedly received in bores 21 (shown in FIG. 4) of the ledge portions surrounding window 12. It will be noted that the mounting plate 19 may be attached to any of the three faces (sides and bottom) of the housing 11 having a window 12 through which the gear 16 and its shaft 17 may pass into the interior of the housing. Upon such attachment, the gear 16 will mesh with gear 15 and the shaft 17 will extend outwardly in a direction substantially perpendicular to the shaft 13. Furthermore, additional output shafts 17 may be provided, besides the one shown, at the unoccupied windows 12. A cover plate 22 is fastened to each unoccupied window 12 to prevent foreign matter from entering the gear box. The housing is further provided with rails 23 for slidably attaching it to the chassis of a vehicle. The shafts 13 and 17 are formed with splines 13', 13'' and 17' on their projecting extremities for coupling purposes. A pair of mounting plates 24 serve as means for attaching the implements driven by shafts 17 to the bottom of housing 11.

Figure 2:
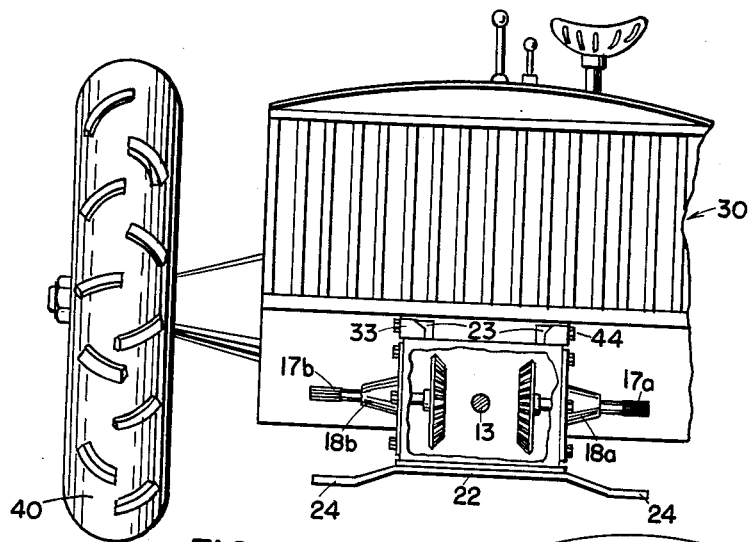
FIG. 2 is a front-elevational view of the assembly, partially broken away, mounted as a front attachment on an agricultural tractor.
Figure 3:
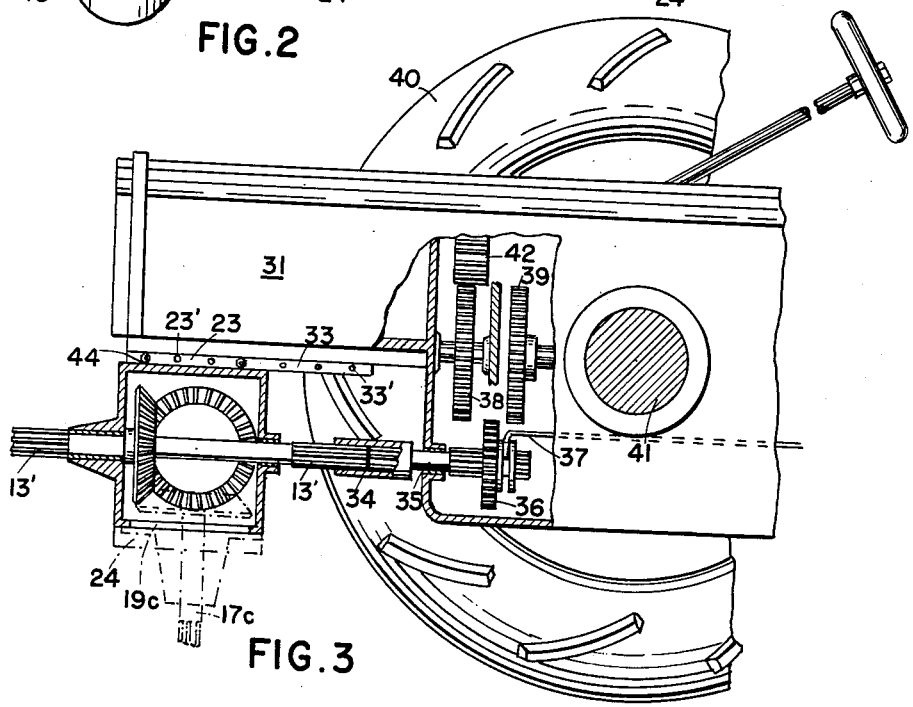
FIG. 3 is a side-elevational view of the assembly with parts broken away.
Figure 4:
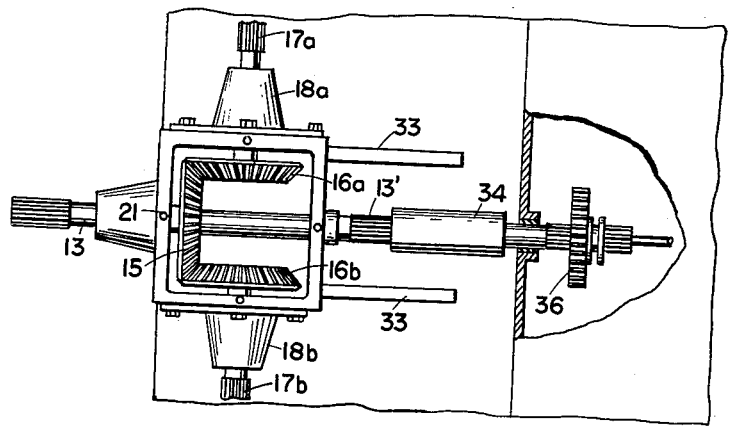
FIG. 4 is a bottom plan view of the device with the bottom plate thereof removed.

In FIGS. 2–4 I show the device 10 secured to the front end of a tractor 30 beneath the engine 31 thereof. The underside of the tractor is provided with a pair of rails 33 longitudinally extending in the direction of the tractor axis and adapted to dovetail with the rails 23 provided on the upper face of the housing 11. The latter is slidably displaceable along rails 33 to enable the splined end 13' of the drive shaft 13 to enter an internally splined sleeve 34 integral with a conventional front power-takeoff shaft 35 journaled in a portion of the tractor body. Shaft 35 is provided on its splined extremity remote from sleeve 34 with a gear 36 axially displaceable thereon, via a shifting arm 37, between a first position in mesh with a gear 38 connected to the gear-changing transmission 42 of the tractor and a second position in mesh with a gear 39 driven, for example, from the wheel 40 of the tractor via axle 41. In the first position each output shaft 17 and the projecting extremity 13'' of drive shaft 13 will be driven at a rate dependent upon the engine speed or upon the position of the transmission gears, while in the second position the rate will depend only upon the rotation speed of the tractor wheels and will hence be proportional to the velocity of the tractor. Two laterally projecting output shafts 17a, 17b, with driven gears 16a, 16b and trunnions 18a, 18b, are shown mounted on housing 11 in FIG. 2, a downwardly extending shaft 17c being illustrated in dot-dash lines in FIG. 3; to accommodate the bearing plate 19c of shaft 17c, the bottom cover 22 shown in FIG. 2 is first removed as illustrated in FIG. 4.

The attachment 10 may be locked in position along rails 33 by conventional fastening means such as, for example, one or more pins 44 adapted to traverse alignable bores 23' and 33' provided in rails 23 and 33 respectively.

Figure 5:
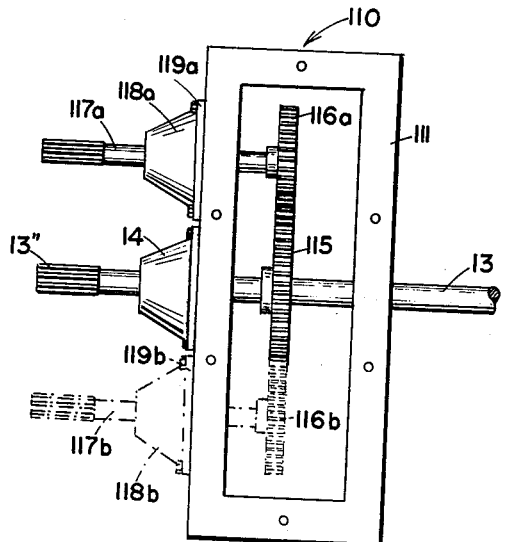
FIG. 5 is a partial bottom view of a modified assembly according to the invention.

FIG. 5 illustrates a modified attachment 110 for the selective coupling of one or more auxiliary power-take-off shafts 117a, 117b on the vehicle in a direction parallel to drive shaft 13. The shafts 117a, 117b can be detachably secured, by their trunnions 118a, 118b, to a housing 111 within which a spur gear 115 is keyed to drive shaft 13. Gear 115 is adapted to mesh with a similar spur gear 116a, 116b, of like or different diameter, secured to a respective output shaft 117a, 117b. Cover plates, not shown, can be attached to housing 111 to span the windows left vacant upon the removal of the bearing plates 119a and/or 119b.

It will be apparent that an attachment 10 or 110 may also be coupled to power shaft 35 at the rear of the vehicle, rather than at the front as shown.

The above and other modifications and variations, readily apparent to persons skilled in the art, are intended to be included within the spirit and scope of the present invention, except as further limited by the appended claims.

I claim:
1. In an automotive vehicle, in combination, a chassis, a power shaft on said chassis, walls forming a prismatic housing slidably mounted on said chassis in line with said power shaft, a drive shaft coupled to said power shaft with relative axial mobility and extending into said housing, said walls including a first wall extending transversely to said shaft and a second wall perpendicular to said first wall, a drive bevel gear carried by said drive shaft within said housing, at least one of said walls being provided with an aperture, a cover plate for said aperture removably secured to said housing, bearing means on said cover plate, and at least one outwardly projecting auxiliary shaft journaled in said bearing means and provided with a driven bevel gear adapted to pass through said aperture and detachably meshing with said drive gear.

2. The combination according to claim 1 wherein said chassis is provided on its underside with rails supporting said housing.

3. In an automotive vehicle, in combination, a chassis, a power shaft below said chassis, walls forming a prismatic housing on the underside of said chassis, a drive shaft coupled to said power shaft and passing through said housing, said walls including a first wall extending transversely to said shaft and a second wall perpendicular to said first wall, said drive shaft having a free end projecting beyond said first wall for use as a power takeoff, a drive bevel gear carried by said drive shaft within said housing, said second wall being provided with an aperture, a cover plate for said aperture removably secured to said housing, bearing means on said cover plate, and at least one outwardly projecting auxiliary shaft journaled in said bearing means and provided with a driven bevel gear adapted to pass through said aperture and detachably meshing with said drive gear, said auxiliary shaft extending at right angles to said free end.

4. The combination according to claim 3 wherein said housing is provided with mounting means enabling adjustment of its position in axial direction of said drive shaft, said drive shaft being aligned with said power shaft, one of said aligned shafts being provided with a profiled sleeve slidably engaging a complementarily profiled extremity of the other of said aligned shafts.

5. In an automotive vehicle having a ground-engaging wheel and an engine, in combination, a chassis, a power shaft below said chassis, walls forming a prismatic housing on the underside of said chassis, a drive shaft coupled to said power shaft and passing through said housing, said walls including a first wall extending transversely to said shaft and a second wall perpendicular to said first wall, said drive shaft having a free end projecting beyond said first wall for use as a power takeoff, a drive bevel gear carried by said drive shaft within said housing, at least one of said walls being provided with an aperture, a cover plate for said aperture removably secured to said housing, bearing means in said cover plate at least one outwardly projecting auxiliary shaft journaled in said bearing means and provided with a driven bevel gear adapted to pass through said aperture and detachably meshing with said drive gear, and transmission means on said power shaft for selectively coupling the latter with said wheel and with said engine.

References Cited in the file of this patent

UNITED STATES PATENTS

| | | |
|---|---|---|
| 1,219,545 | Gilbertson | Mar. 20, 1917 |
| 1,539,787 | Susio | May 26, 1925 |
| 1,678,289 | Hartmann | July 24, 1928 |
| 2,113,917 | Jersey | Apr. 12, 1938 |
| 2,179,171 | Boho | Nov. 7, 1939 |
| 2,192,146 | Nightenhelser et al. | Feb. 27, 1940 |
| 2,199,659 | Courville | May 7, 1940 |
| 2,445,828 | Heinsohn | July 27, 1948 |
| 2,450,896 | Kimberly | Oct. 12, 1948 |
| 2,669,881 | Skidmore | Feb. 23, 1954 |
| 2,755,686 | Bade | July 24, 1956 |
| 2,798,382 | Fletcher et al. | July 9, 1957 |
| 2,869,384 | Schmitter | Jan. 20, 1959 |
| 3,002,393 | Browning | Oct. 3, 1961 |

FOREIGN PATENTS

| | | |
|---|---|---|
| 1,078,786 | France | Nov. 23, 1954 |